(12) United States Patent
Chen et al.

(10) Patent No.: US 8,420,176 B2
(45) Date of Patent: Apr. 16, 2013

(54) METHOD FOR PREPARING A SELECTIVELY PERMEABLE PROTECTIVE STRUCTURE

(75) Inventors: John Chu Chen, Hockessin, DE (US); Donna Lynn Visioli, Lower Gwynedd, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 452 days.

(21) Appl. No.: 12/762,818

(22) Filed: Apr. 19, 2010

(65) Prior Publication Data

US 2010/0272914 A1  Oct. 28, 2010

Related U.S. Application Data

(60) Provisional application No. 61/172,036, filed on Apr. 23, 2009.

(51) Int. Cl.
*B05D 1/00* (2006.01)
*B05D 1/30* (2006.01)
*E04B 1/62* (2006.01)

(52) U.S. Cl.
USPC .................. 427/398.1; 427/407.1; 52/408

(58) Field of Classification Search .................. None
See application file for complete search history.

(56) References Cited

U.S. PATENT DOCUMENTS

| 6,579,948 | B1 | 6/2003 | Tan |
| 6,645,336 | B1 | 11/2003 | Alberstone |
| RE38,429 | E | 2/2004 | Eichbauer |
| 6,808,772 | B2 | 10/2004 | Kunzel |
| 6,878,455 | B2 | 4/2005 | Kunzel |
| 6,890,666 | B2 | 5/2005 | Kunzel |
| 7,285,324 | B1 | 10/2007 | Alberstone |
| 7,514,380 | B2 | 4/2009 | Chen |
| 2003/0198715 | A1 | 10/2003 | Morris |
| 2003/0215609 | A1 | 11/2003 | Burkart |
| 2004/0103603 | A1 | 6/2004 | Kunzel |
| 2004/0103604 | A1 | 6/2004 | Kunzel |
| 2004/0103607 | A1 | 6/2004 | Kunzel |
| 2004/0245391 | A1 | 12/2004 | Kunzel |
| 2005/0124741 | A1* | 6/2005 | Chen ........................... 524/300 |
| 2005/0229524 | A1* | 10/2005 | Bennett et al. .............. 52/481.1 |
| 2007/0283652 | A1 | 12/2007 | Chen |
| 2007/0287019 | A1 | 12/2007 | Chen |
| 2008/0176468 | A1 | 7/2008 | Chen |

FOREIGN PATENT DOCUMENTS

| WO | 2004043155 A2 | 5/2004 |
| WO | 2005056669 A1 | 6/2005 |
| WO | 2008082624 A2 | 7/2008 |
| WO | 2010/022066 A2 | 2/2010 |

\* cited by examiner

*Primary Examiner* — James Lin
*Assistant Examiner* — Francisco Tschen

(57) ABSTRACT

A method for preparing a multilayer package comprising a substrate and a composition having a moisture vapor permeation value of at least 200 g-mil/m$^2$/24h and barrier to liquid water. The method comprises melt blending an organic acid-modified ionomer with an ethylene-containing copolymer and a copolymer comprising a dicarboxylic acid derivative as a comonomer to provide a composition and applying the composition to the substrate in a molten condition and allowing the composition to cool and solidify.

16 Claims, No Drawings

METHOD FOR PREPARING A SELECTIVELY PERMEABLE PROTECTIVE STRUCTURE

This application claims priority to U.S. provisional application 61/172,036, filed Apr. 23, 2009; the entire disclosure of which is incorporated herein by reference.

This invention relates to a method for preparing a selective permeable structure for covering or packaging objects during transportation and storage.

BACKGROUND

Equipment is often wrapped or packaged with film or fabric tarpaulins, hoods or other covers to prevent surface damage during transportation and storage. These covers may be prepared from high barrier (highly moisture impermeable) films and fabrics (see, e.g., http://www.heritagepackaging.com/productservices/barrier packaging/bpbasics/ bp basics.htm).

Many relatively small items are shipped on pallets, that is, platforms that are easily moved by forklifts or small cranes. Pallets provide convenience in loading and unloading goods from shipping containers, and in moving smaller amounts of goods over shorter distances, such as within warehouses, or to deliver a retail quantity. The small items may be unpackaged or packaged, for example in bags or boxes, when they are placed on the pallets.

A loaded pallet must have integrity and stability, so that the goods are not damaged or lost during shipping. To provide the necessary integrity and stability, the pallet and its load have been typically wrapped together in film, for example overlapping layers of polyethylene stretch wrap that may be applied by machine or by hand. See, e.g., US RE38429. Other generally practiced methods of providing integrity and stability to loaded pallets include wrapping the pallet and its load in heat shrinkable film, encasing the loaded pallet in a sheath or "hood" which may be heat shrinkable or stretchable, and containing the goods in a single carton or box. These methods are sometimes referred to, individually or collectively, as "pallet unitizing".

Using barrier films for wrapping small objects or articles in sealed bags is generally suitable since the object may be dried before being sealed in the bags and/or drying agents may be included inside the sealed bags. This approach is less suitable for large objects such as vehicles, boats, motors, machinery, industrial goods, pallets or containers holding smaller articles, and other bulky equipment because the covers are typically not hermetically sealed around the object and thorough drying of the object may not be feasible. This may be especially problematic during storage or when shipping by ship or railroad, because the large objects may be exposed to adverse weather conditions for long periods of time. Atmospheric moisture and/or rain may enter the space under the cover and be trapped and condense. With high barrier covers, there is no way for water to permeate back outside the cover, resulting in a buildup of moisture inside the cover, leading to the possibility of corrosion.

Large amounts of money are lost each year because of corrosion of, for example, iron, steel, and other metals. There are many factors affecting corrosion rate including moisture, oxygen, and salt presence. A common corrosion occurs due to electrochemical reactions at high humidity conditions. For example, when iron is exposed to moist air, it reacts with oxygen to form rust (iron oxide). The result of corrosion may be the formation of metal oxide that flakes off easily, causing extensive pitting thereby causing structural weakness and disintegration of the metal. Corrosion can also affect other properties of metal parts such as reducing conductivity or increasing surface roughness so that moving parts become unable to move freely.

In addition to corrosion of metals, mold growth may occur in the condensed moisture on the surface of the equipment.

Using a film or cover with a high water vapor transmission rate can prevent condensation of water inside the cover by allowing equilibration of the trapped moisture back into the surrounding atmosphere. Using such a film prevents or reduces rust formation and corrosion and reduces the opportunity for mold growth.

Various permeable materials having a wide range of mechanical and transport properties are known. Depending upon the particular application in which the permeable material is to be employed, however, certain combinations of properties are required. For a protective cover application, it is desirable that the material transports water vapor, but blocks the transport of liquid water or other fluids, and be lightweight and flexible over a broad temperature range. A need exists for a material that can be a flexible, solid material with membrane characteristics that facilitate the transport of water vapor, for example, from equipment inside a cover to the atmosphere and block entry of liquids such as water, oil or corrosive fluids.

Many previous permeable membranes are microporous (i.e., permeable due to the presence of microscopic pores through which vapor can pass). Microporous membranes, which may be laminated on or between nonwoven textiles, have increased permeability, but may not provide adequate barriers to liquids because of their nonselective permeability. Liquids under pressure may be able to penetrate the pores. Most microporous films are biaxially oriented, so only a small amount of shrinkage is possible, and they cannot be shrunk without losing their porosity. They may also have low tear strength and their surfaces may be easily fouled, thereby losing permeability.

Various references describe semipermeable materials produced from a variety of polymers that may be useful for protective covers. See e.g., U.S. Pat. No. 6,579,948. Recently protective fabrics comprising a selectively permeable membrane comprising organic acid-modified ionomer compositions have been disclosed (U.S. Pat. No. 7,514,380). Although compositions disclosed therein provide excellent selective permeability, adhesion to certain textiles may be insufficient to provide a robust protective structure.

Because no single material has emerged which satisfies all of the technical requirements and that presents a cost-effective alternative, it is desirable to provide a selectively permeable membrane or structure or layer that displays a combination of mechanical properties, low temperature flexibility, selective transport, ease of processability, and cost-effectiveness, so as to render it suitable for use as a protective cover for objects that limits corrosion and/or mold growth.

SUMMARY OF THE INVENTION

This invention provides a method for preparing a selectively permeable multilayer structure or article comprising or consisting essentially of:

1) preparing a first composition comprising, consisting essentially of, or consisting of
  (i) one or more ethylene acid copolymers; and
  (ii) one or more organic acids; wherein at least 50% of the combined acidic groups in the acid copolymer and the organic acid are nominally neutralized to salts with metal ions and at least 50% of the metal ions are alkali metal ions;

(2) melt blending the first composition with one or more ethylene-containing polymers selected from the group consisting of polyethylene (PE) homopolymers, copolymers of ethylene and an α-olefin, copolymers of ethylene and a diolefin, and ethylene copolymers obtained from copolymerization of ethylene with at least one polar monomer selected from the group consisting of vinyl acetate, acrylic ester, methacrylic ester and carbon monoxide, wherein ethylene-containing polymer does not comprise a dicarboxylic acid derivative, to provide a second composition;

3) melt blending the second composition with a polymer comprising 0.1 to 15 weight % of a dicarboxylic acid derivative selected from the group consisting of maleic anhydride, citraconic anhydride, itaconic anhydride, tetrahydrophthalic anhydride, monoalkyl esters of maleic acid, fumeric acid, citraconic acid, itaconic acid or tetrahydrophthalic acid, and combinations thereof, to provide a third composition in a molten condition;

4) contacting a substrate with the molten third composition to adhere, embed, or impregnate the melted composition to the substrate or adhere, embed, or impregnate the substrate to the molten third composition to provide a coated substrate with the third composition in a molten condition;

5) cooling the coated substrate to allow the molten third composition to cool and solidify.

In the method, the one or more ethylene acid copolymers may comprise an E/X/Y ethylene acid copolymer or ionomer of the acid copolymer wherein E represents copolymerized units of ethylene, X is present in about 2 to about 35 weight % of the copolymer and represents copolymerized units of at least one $C_3$ to $C_8$ α,β-ethylenically unsaturated carboxylic acid, and Y is present in 0 to about 35 weight % of the copolymer and represents copolymerized units of alkyl acrylate or alkyl methacrylate; and the one or more monocarboxylic acids have from 4 to 36 carbon atoms, or salts thereof.

An embodiment is one in which the third composition comprises, consists essentially of, or consists of (a) 30 to 50 weight %, based on the combination of (a), (b) and (c), of a blended combination of (1) 70 to 90 weight %, based on the combination of (1) and (2), of one or more E/X/Y ethylene acid copolymers or ionomers of the acid copolymers wherein E represents copolymerized units of ethylene, X is present in about 2 to about 35 weight % of the copolymer and represents copolymerized units of at least one $C_3$ to $C_8$ α,β-ethylenically unsaturated carboxylic acid, and Y is present in 0 to about 35 weight % of the copolymer and represents copolymerized units of alkyl acrylate or alkyl methacrylate;

(2) 10 to 30 weight %, based on the combination of (1) and (2), of one or more organic acids having from 4 to 36 carbon atoms, or salts thereof; wherein at least 50% of the combined acidic groups in the E/X/Y copolymer and the organic acid are nominally neutralized to salts with metal ions; wherein at least 50% of the metal ions are alkali metal ions;

(b) 40 to 60 weight %, based on the combination of (a), (b) and (c), one or more ethylene-containing polymers selected from the group consisting of polyethylene homopolymers, copolymers of ethylene and an α-olefin, copolymers of ethylene and a diolefin, and ethylene copolymers obtained from copolymerization of ethylene with at least one polar monomer selected from the group consisting of vinyl acetate, acrylic ester, and carbon monoxide, wherein the ethylene-containing polymer does not comprise a dicarboxylic acid derivative; and (c) 1 (or 5) to 15 weight %, based on the combination of (a), (b) and (c), of the polymer comprising 0.1 to 15 weight % of a dicarboxylic acid derivative; wherein (a), (b) and (c) total 100 weight %.

Of note is wherein the third composition comprising (a), (b) and (c) has greater adhesion to the substrate than a corresponding composition comprising an equal amount of (a) and an amount of (b) equal to the amount of (b) and (c) in the third composition.

The method can be used to prepare a selectively permeable structure that can be used as a protective article. Notably, the third composition has a moisture vapor permeation value (MVPV) of at least 200 g-mil/m$^2$/24 h and high water-entry pressure; and the selectively permeable structure has a moisture vapor transmission rate (MVTR) of at least 30 g/m$^2$/24 h. The MVPV and MVTR are measured at 37.8° C. and 100% relative humidity according to ASTM F-1249.

DETAILED DESCRIPTION OF THE INVENTION

The entire disclosures of all references are incorporated herein by reference and tradenames or trade marks are shown in upper case. The word(s) following the verb "is" can be a definition of the subject.

"(Meth)acrylic acid" includes methacrylic acid and/or acrylic acid and "(meth)acrylate" includes methacrylate and/or acrylate.

"Selectively permeable" means permeation is allowed only to certain molecules in a specific state such as vapor or gas and not to other molecules or in a different state such as liquid or solid. Such molecules can be dissolved or dispersed in the matrix of certain materials such as a film or sheet of the composition disclosed herein and thereafter be diffused or migrated through the material.

The selectively permeable third composition may have MVPV of at least 200, at least 800, at least 900, at least 1200, at least 2000, at least 4,000 g-mil/m$^2$/24 h, or even higher. MVPV is an indicator of the inherent permeability of the composition, by measuring moisture permeation of a membrane comprising the composition, which may be a film or sheet that is normalized to 1 mil thickness.

Selectively permeable protective covers may have MVTR of at least 30, at least 50, at least 100, at least 500, or at least 1000 g/m$^2$/24 h, or even higher. MVTR measures total moisture vapor transmitted through an article across its smallest dimension during a unit time, disregarding the structure thickness. For a membrane of a given composition and MVPV, MVTR decreases as the thickness increases.

A selectively permeable protective structure provides a combination of mechanical properties, low temperature flexibility, selective transport, ease of processability, and cost-effectiveness.

The composition can be formed into a monolithic or continuous membrane that functions as a selectively permeable barrier. Monolithic continuous membranes, in contrast to microporous membranes, have high water-entry pressure and are waterproof and liquidproof. High water-entry pressure refers to >150 cm (or >250 cm or >500 cm) $H_2O$ hydrostatic head, as described in DIN EN20811:92.

Therefore, monolithic membranes provide barriers to liquids such as water, while still allowing permeability to water vapor under appropriate conditions. A monolithic barrier is also effective at preventing exposure to liquids such as water, solvents, oils, corrosive fluids and the like, or particulates or solids, including dust, irritants, mold spores, allergens, pollen, animal dander, hair and the like.

The selectively permeable membrane may be selective to liquid penetrants depending on the size and polarity of the penetrants, i.e., has selectivity so as to be capable of allowing water to diffuse through at a higher rate than virtually all organic liquids having a molecular weight higher than that of methanol.

The acid copolymers used in the method are preferably "direct" or "random" acid copolymers. Direct or random copolymers are polymers polymerized by adding all monomers simultaneously, as distinct from a graft copolymer, where another monomer is grafted onto an existing polymer, often by a subsequent free radical reaction.

Examples of X include unsaturated acids such as acrylic acid or methacrylic acid. Preferably X is from 5 to 25 weight % of the E/X/Y copolymer.

Notable are E/X/Y copolymers wherein Y is 0 weight % of the polymer (that is, an E/X dipolymer). When present, Y is present in at least 0.1 weight %, or about 2 to about 35 weight % of the E/X/Y copolymer.

Examples of Y include alkyl acrylate, alkyl methacrylate, or combinations thereof wherein the alkyl groups have from 1 to 8, or 1 to 4, carbon atoms. Y is a softening comonomer (softening means that the polymer is made less crystalline).

Ethylene acid copolymers may be produced by any methods known to one skilled in the art such as use of "co-solvent technology" disclosed in U.S. Pat. No. 5,028,674.

Specific acid copolymers include ethylene/acrylic acid dipolymers, ethylene/methacrylic acid dipolymers, and ethylene/acrylic acid/n-butyl acrylate, ethylene/methacrylic acid/n-butyl methacrylate, ethylene/acrylic acid/iso-butyl acrylate, ethylene/methacrylic acid/iso-butyl methacrylate, ethylene/acrylic acid/methyl acrylate, ethylene/methacrylic acid/methyl methacrylate, ethylene/acrylic acid/ethyl acrylate and ethylene/methacrylic acid/ethyl methacrylate terpolymers, or combinations of two or more thereof. An ethylene/methacrylic acid dipolymer of note comprises 19 weight % of copolymerized units of methacrylic acid.

Ionomers are obtained by neutralization of an acid copolymer. Neutralizing agents including metal cations such as sodium or potassium ions are used to neutralize at least some portion of the acidic groups in the acid copolymer. Unmodified ionomers are prepared from the acid copolymers such as those disclosed in U.S. Pat. No. 3,262,272. "Unmodified" refers to ionomers that are not blended with any material that has an effect on the properties of the unblended ionomer. The acid copolymers may be used to prepare unmodified, melt processable ionomers by treatment with a metal compound. The unmodified ionomers may be nominally neutralized to any level such as about 15 to about 90% or about 40 to about 75% of the acid moieties.

The organic acids may be monobasic, having fewer than 36 carbon atoms, or salts thereof. The acids are optionally substituted with from one to three substituents independently selected from the group consisting of $C_1$-$C_8$ alkyl, OH, and OR' in which each $R^1$ is independently $C_1$-$C_8$ alkyl, $C_1$-$C_6$ alkoxyalkyl or $COR^2$; and each $R^2$ is $C_1$-$C_8$ alkyl.

Examples of organic acids include $C_4$ to $C_{36}$ (such as $C_{34}$, $C_{426}$, $C_{6-22}$, or $C_{12-22}$) acids. At high neutralization such as greater than 80%, up to 100%, nominal neutralization (i.e., sufficient metal compound is added such that all acid moieties in the copolymer and organic acid are nominally neutralized), volatility is not an issue and organic acids with lower carbon content may be used, though it is preferred that the organic acid (or salt) be non-volatile (not volatile at temperatures of melt blending of the agent with the acid copolymer) and non-migratory (not bloom to the surface of the polymer under normal storage conditions (ambient temperatures)).

Examples of organic acids include, but are not limited to, caproic acid, caprylic acid, capric acid, lauric acid, stearic acid, isostearic acid, arachidic acid, behenic acid, erucic acid, oleic acid, and linoleic acid. Organic (fatty) acids include palmitic acid, stearic acid, oleic acid, erucic acid, behenic acid, isostearic acid, 12-hydroxystearic acid, or combinations of two or more thereof. Saturated organic acids, such as stearic acid, arachidic acid, and behenic acid, may be preferred.

Organic acids may be commercially available as a mixture of named organic acid(s) and a number of structurally different organic acids of varying lesser amounts. When a composition comprises a named acid, other unnamed acids may be present at levels conventionally known to be present in commercial supplies of the named acid. For example, a commercially available mixture of acids includes 90 weight % of a mixture of arachidic acid ($C_{20}$ acid) and behenic acid ($C_{22}$ acid) with 6 weight % of $C_{18}$ acids and 4 weight % of other acids.

Salts of any of these organic acids may include the alkali metal salts, such that the metal ions present in the final composition comprise at least 50% of alkali metal ions, including lithium, sodium, potassium salts and/or cesium salts, preferably sodium salts or potassium salts.

The amount of basic metal compound capable of neutralizing acidic groups may be provided by adding the stoichiometric amount of the basic compound calculated to neutralize a target amount of acid moieties in the acid copolymer and organic acid(s) in the blend (herein referred to as "% nominal neutralization" or "nominally neutralized"). Thus, sufficient basic compound is made available in the blend so that, in aggregate, the indicated level of nominal neutralization could be achieved. Greater than 50%, 60%, 70%, 80% or 90% (or even 100%) of the total acidic groups in the E/X/Y copolymers and organic acids may be nominally neutralized with metal ions; and the metal ions comprise at least 50 mole % alkali metal ions, preferably sodium or potassium. Small amounts of salts of alkaline earth metal and/or transition metal ions may be present in addition to the alkali metals.

Metal compounds may include compounds of alkali metals, such as lithium, sodium, potassium, or cesium or combinations of such cations. Examples include sodium, potassium, cesium or any combination of sodium, potassium, and/or cesium, optionally including small amounts of other cations such as other alkali metal ions, transition metal ions or alkaline earth ions. Metal compounds of note include formates, acetates, nitrates, carbonates, hydrogencarbonates, oxides, hydroxides or alkoxides of the ions of alkali metals, especially sodium and potassium, and formates, acetates, nitrates, oxides, hydroxides or alkoxides of the ions of alkaline earth metals and transition metals. Of note are sodium hydroxide, potassium hydroxide, sodium acetate, potassium acetate, sodium carbonate and potassium carbonate.

The ethylene acid copolymers or unmodified ionomers may be mixed with organic acids or salts thereof and/or metal compounds, by any means known to one skilled in the art, to prepare a blended modified ionomer composition comprising (1) and (2) as described above. It is substantially melt-processable and may be produced by combining one or more ethylene acid copolymers, one or more monobasic carboxylic acids or salts thereof, basic compound(s) to form a mixture; and heating the mixture under a condition sufficient to produce the composition. Heating may be carried out under a temperature in the range of from about 80 to about 350, about 100 to about 320, or 120 to about 300° C. under a pressure that accommodates the temperature for a period from about 30 seconds to about 2 or 3 hours. For example, the composition may be produced by melt-blending an acid copolymer and/or ionomer thereof with one or more organic acids or salts thereof; concurrently or subsequently combining a sufficient amount of a basic metal compound capable of neutralization of the acid moieties to nominal neutralization levels greater than 50, 60, 70, 80, 90%, to near 100%, or to 100%. A salt-and-pepper blend of components may be heated or the components may be melt-blended in an extruder. For example, a twin-screw extruder may be used to mix and treat the acid copolymer and the organic acid (or salt) with the metal compound at the same time. It is desirable that the blending is conducted so that the components are intimately mixed, allowing the basic metal compound to neutralize the acidic moieties.

Treatment of acid copolymers and organic acids with metal compounds in this manner (concurrently or subsequently), such as without the use of an inert diluent, may produce a composition without loss of processability or properties such as toughness and elongation to a level higher than that which would result in loss of melt processability and properties for the ionomer alone.

In a second step, the organic acid-modified ionomer is melt blended with one or more ethylene-containing polymers as defined above. Blending with such polymers may provide better processability, improved toughness, strength, flexibility, and/or compatibility of the blend when adhering to a substrate as described below. Preferably, the modified ionomer combination of (1) and (2) is prepared and subsequently blended with the ethylene-containing polymer. However, in some embodiments the ethylene-containing polymer may be melt blended with the components of the organic acid-modified ionomer during its preparation. That is, steps (1) and (2) may be conducted simultaneously in a single process operation. A salt-and-pepper blend of the organic acid-modified ionomer and the ethylene-containing polymer may be heated above their melting temperatures and mixed or the components may be melt-blended in an extruder.

The ethylene-containing polymers may include polyethylene (PE) homopolymers and copolymers. PE homopolymers and copolymers may be prepared by a variety of methods, for example, the well-known Ziegler-Natta catalyst polymerization (e.g., U.S. Pat. No. 4,076,698 and U.S. Pat. No. 3,645,992), metallocene catalyzed polymerization, VERSIPOL catalyzed polymerization and by free radical polymerization. The polymerization may be conducted as solution phase processes, gas phase processes, and the like. Examples of PE polymers may include high density PE (HDPE), linear low density PE (LLDPE), low density PE (LDPE), very low or ultralow density PEs (VLDPE or ULDPE), lower density PE made with metallocene having high flexibility and low crystallinity (mPE). Metallocene technology is described in, for example, U.S. Pat. Nos. 5,272,236, 5,278,272, 5,507,475, 5,264,405, and 5,240,894.

The density of PE may range from about 0.865 g/cc to about 0.970 g/cc. Linear PE may incorporate α-olefin comonomers such as butene, hexene or octene to decrease density to within the density range so described. For example, a copolymer may comprise a major portion (by weight) of ethylene that is copolymerized with another α-olefin having 3-20 carbon atoms and up to about 20% by weight of the copolymer. Other α-olefins are propylene, 1-butene, 1-hexene, 4-methyl-1-pentene, 1-octene, 1-decene, 1-tetradecene, 1-octadecene, or in combinations of two or more. Of note are metallocene polyethylenes comprising ethylene/octene copolymers.

The PE copolymer may also be an ethylene propylene elastomer containing a small amount of unsaturated compounds having a double bond. The term "PE" when used herein is used generically to refer to any or all of the polymers comprising ethylene described above.

Ethylene copolymers having small amounts of a diolefin component such as butadiene, norbornadiene, hexadiene and isoprene are also generally suitable. Terpolymers such as ethylene/propylene/diene monomer (EPDM) are also suitable.

The ethylene-containing polymer may include ethylene copolymers obtained from copolymerization of ethylene with at least one polar monomer such as ethylene/vinyl acetate copolymer (EVA), ethylene/acrylic ester copolymers, ethylene/methacrylic ester copolymers, ethylene/vinyl acetate/CO copolymers, ethylene/acrylic ester/CO copolymers, and/or mixtures of any of these.

EVA includes copolymers derived from the copolymerization of ethylene and vinyl acetate or the copolymerization of ethylene, vinyl acetate, and an additional comonomer. The vinyl acetate comonomer may have 2 to 45 or 6 to 30 weight % derived from vinyl acetate. An EVA may have a melt flow rate, measured in accordance with ASTM D-1238, of from 0.1 to 60 g/10 or 0.3 to 30 g/10 minutes. A mixture of two or more different EVAs may be used.

Ethylene/alkyl(meth)acrylate copolymer includes copolymers of ethylene and one or more $C_{1-8}$ alkyl(meth)acrylates. Examples of alkyl(meth)acrylates include methyl acrylate, ethyl acrylate and butyl acrylate. Examples of the copolymers include ethylene/methyl acrylate copolymer ethylene/ethyl acrylate copolymer, ethylene/butyl acrylate copolymer, or combinations of two or more thereof. Alkyl(meth)acrylate may be incorporated into an ethylene/alkyl (meth)acrylate copolymer at 2 to 45, 5 to 45, 10 to 35, or 10 to 28 weight %.

Ethylene/alkyl(meth)acrylate copolymers may be prepared by processes well known to one skilled in the art using either autoclave or tubular reactors. See, e.g., U.S. Pat. Nos. 2,897,183, 3,404,134, 5,028,674, 6,500,888, and 6,518,365. Because the methods for making an ethylene/alkyl(meth) acrylate copolymer are well known, the description of which is omitted herein for the interest of brevity. Tubular reactor produced ethylene/alkyl(meth)acrylate copolymers are commercially available from E. I. du Pont de Nemours and Company, Wilmington, Del. (DuPont) such as ELVALOY® AC. The ethylene/alkyl (meth)acrylate copolymers may vary significantly in molecular weight and the selection of the melt index (MI) grade of polymer may be made by balancing the properties of the ethylene/alkyl(meth)acrylate copolymer with those of the neutralized organic acid and ethylene acid copolymer to provide the desired mix of permeability and structural properties needed for a specific variable permeability construction. A mixture of two or more different ethylene/ alkyl (meth)acrylate copolymers may be used. Of note is the method wherein the second composition or the third composition has at least one ethylene/alkyl (meth)acrylate copolymer present in from 40 to 60 weight %.

Small amounts (from 1 or 5 weight % to about 15 weight %) of polymers comprising dicarboxylic acid derivatives are used in the method to facilitate blending of the modified ionomer combination and the ethylene-containing copolymer, providing improved mechanical properties and/ or enhanced adhesion to a substrate.

The polymer may have a dicarboxylic acid unit derived from an unsaturated dicarboxylic acid anhydride, including units obtained from maleic anhydride, citraconic anhydride, itaconic anhydride, tetrahydrophthalic anhydride, or combinations of two or more thereof. The modified copolymer may be obtained by known techniques, such as a grafting process in which a polymer selected from a PE homopolymer or copolymer, a polypropylene homopolymer or copolymer, an EVA or an ethylene/alkyl(meth)acrylate copolymer, as disclosed above, is dissolved in an organic solvent with an unsaturated dicarboxylic acid anhydride and a radical generator, followed by heating with stirring; and a process in which all the components are fed to an extruder to provide a maleic-anhydride grafted ethylene copolymer. Grafting processes provide copolymers with from 0.1 to about 3 weight % of anhydride units in which the anhydride unit is in a moiety pendant from the backbone of the polymer. These graft copolymers are available commercially from DuPont under the FUSABOND or BYNEL brand names. A graft copolymer of note is an ethylene/methyl acrylate copolymer having 24 weight % copolymerized methyl acrylate units (prior to grafting) grafted with 1.8 weight % of maleic anhydride.

In the method, it may be desirable to use a graft copolymer obtained by grating the anhydride to a polymer having similar composition to the ethylene-containing polymer described above. For example, when an ethylene/methyl acrylate copolymer is the ethylene-containing copolymer, it may be preferable to use a graft copolymer obtained from grafting an ethylene/methyl acrylate copolymer with maleic anhydride.

Anhydride-containing ethylene copolymers also may be readily obtained by a high-pressure free radical process, in which an olefin comonomer and a comonomer such as maleic anhydride are directly copolymerized to provide a copolymer in which atoms from the anhydride unit comprise a portion of the polymer backbone. A suitable high-pressure process is described, for example, in U.S. Pat. No. 4,351,931. This process allows for preparation of copolymers with greater than 3 weight %, for example, about 4 or 5 weight % to about 15 weight %, of anhydride units. These copolymers include olefin/maleate copolymers such as ethylene/maleic anhydride copolymers.

Other dicarboxylic acid derivative-containing polymers include polymers comprising monoalkyl esters of dicarboxylic acids, wherein the alkyl groups in the esters have from 1 to 8, or 1 to 4, carbon atoms. Monoalkyl esters of maleic acid are preferred.

Such polymers include ethylene/maleic acid monoalkyl ester dipolymers; and ethylene/maleic acid monoalkyl ester/n-butyl(meth)acrylate, ethylene/maleic acid monoalkyl ester/methyl(meth)acrylate, ethylene/maleic acid monoalkyl ester/ethyl(meth)acrylate terpolymers, or combinations thereof. These ethylene/maleic acid monoalkyl ester copolymers may be readily obtained by a high-pressure free radical process, in which an olefin comonomer and the maleic acid monoalkyl ester comonomer are directly copolymerized to provide a copolymer in which atoms from the maleic acid monoalkyl ester unit comprise a portion of the polymer backbone. Additional alkyl acrylate or alkyl methacrylate comonomers may also be copolymerized to prepare the terpolymers listed. A suitable high-pressure process is described, for example, in U.S. Pat. No. 4,351,931. This process allows for preparation of copolymers with from about 4 or 5 weight % to about 15 weight %, of maleic acid monoethyl ester units. A maleic acid monoalkyl ester of note is maleic acid monoethyl ester, also known as ethyl hydrogen maleate. Copolymers of note include copolymers of ethylene and maleic acid monoethyl ester having from about 5 to about 10, or from about 6 to about 9 weight % of copolymerized units of maleic acid monoethyl ester.

The modified ionomer combination of (1) and (2) may be prepared, melt blended with the ethylene-containing polymer and then melt blended with the dicarboxylic acid derivative-containing polymer. However, in some embodiments the organic acid-modified ionomer may be prepared and melt blended with the ethylene-containing polymer and the dicarboxylic acid derivative-containing polymer at the same time. That is, steps (2) and (3) may be conducted simultaneously in a single process operation. A salt-and-pepper blend of the organic acid-modified ionomer, the ethylene-containing polymer and the dicarboxylic acid derivative-containing polymer may be heated above their melting temperatures and mixed or the components may be melt-blended in an extruder, either after pre-blending a pellet blend or by feeding the components to the extruder in metered amounts.

When blending polymeric resins the higher flow or lower viscosity resin tends to flow more readily relative to other lower flow resins. This melt rheology effect tends to facilitate the higher flow resin to disperse and distribute more effectively in the blend during the melt blending process and enable more effective distribution at the interface with higher melt shear field. Depending on the blending and extrusion conditions, the ethylene-containing polymer and the dicarboxylic acid derivative-containing polymer components may be concentrated near the surface of the extrudate, providing improved adhesion to the substrate.

The composition may additionally comprise from 0.01 to 15, 0.01 to 10, or 0.01 to 5, weight %, based on the total composition weight, of additives including plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. These additives are described in the Kirk Othmer *Encyclopedia of Chemical Technology.*

The additives may be incorporated into the composition by any known process such as by dry blending, extruding a mixture of the various constituents, the conventional masterbatch technique, or the like.

The composition can further comprise a fire retardant such as a chemical additive including, but not limited to, phosphorous compounds, antimony oxides, and halogen compounds, particularly bromine compounds, and others well known in the art. A loading of such additives can be between 20 to 30, or about 25% (of the final air-dried composition or air-dried film weight).

The composition may also comprise fillers, fibers, or pulps in added quantities that may be up to 30 to 40 weight % of the total composition. These materials may provide reinforcement or otherwise modify the mechanical properties of the composition, without negatively impacting the selective permeability of the composition. Fillers include, for example, inorganic materials such as carbon black, $TiO_2$, calcium carbonate ($CaCO_3$). Fibers, including chopped fibers, include glass fibers, aramid fibers, carbon fibers and the like. Pulps include, for example aramid micropulps (micropulp has a volume average length from about 0.01 to about 100 micrometers).

The melt blending steps described above provide the third composition of the method, which is selectively permeable.

In the method, the third composition is applied to a substrate in molten condition by, for example but not limitation, extrusion coating to a substrate or lamination of two substrate layers by means of an inner layer of the composition applied in molten form to adhere the substrates together. Generally, the substrate and a layer of the third composition may be arranged in overlaying or overlapping fashion to provide a protective structure. When used with a substrate, the selectively permeable composition may have a thickness from about 10 to about 250 µm.

In some embodiments the polymer composition can be coated directly on a substrate using fabric impregnation and coating techniques. For example, the selectively permeable composition is a coating applied directly on the substrate (via extrusion coating, spraying, painting or other appropriate application methods). Such coating can be applied using spreading methods known in the art such as with a rubber doctor blade or with a slit extrusion machine.

The composition can be applied to one side or both sides of a textile substrate. In the case where the substrate is coated or laminated on one side, the composition may be applied to the side that is directly exposed to the environment to provide a liquid-impermeable outer surface. Alternatively, in applications where mechanical wear or abrasion is likely, the composition may be applied to the side of the textile substrate opposite the side exposed to the mechanical wear to afford protection of the polymeric composition.

In other embodiments the composition can be impregnated in a substrate or the substrate can be impregnated in the polymer.

The selectively permeable composition may be formed at least partially in the substrate by impregnating the substrate with the composition by applying the molten composition to the substrate and then cooling the composition while it is in contact with the pores of the substrate.

The composition can be dispersed throughout the substrate such as a loosely woven fabric where the composition fills gaps in the substrate and does not just adhere on the surface of a substrate. The substrate can be impregnated inside the selectively permeable membrane through lamination or coextrusion process to have the permeable compositions on both sides of the substrate.

The composition can also be accommodated between two layers of textiles in a sandwich-like manner. Several layer assemblies can also be assembled one above the other. For example, the configuration can comprise the selectively permeable membrane layer, a substrate layer, another selectively permeable membrane layer, another substrate layer, and so on, depending upon desired applications of the protective structure. Other configurations can comprise variations of the aforementioned sandwich configuration, including a plurality of selectively permeable membrane layers, a plurality of substrate layers, and so forth, including mixtures thereof.

The substrate may be any material providing support, shape, esthetic effect, protection, surface texture, bulk volume, weight, or combinations of two or more thereof to enhance the functionality and handability of the structure.

A substrate can be a vehicle to aid in incorporating the selectively permeable composition or provide mechanical support for the membrane so that permeability is not hindered. Preferably a substrate has water vapor diffusion that is greater than the water vapor diffusion of the selectively permeable membrane so that the water vapor diffusion characteristics of the structure are essentially provided by the selectively permeable composition. That is, the substrate does not substantially affect the passage of water vapor through the layered structure, and for example, may have a measured MVTR of at least 1.8, 4, 5, or even 10, $Kg/m^2/24$ hours.

Any support or substrate meeting these desired characteristics may be used with the selectively permeable composition. Examples include a textile or porous sheet material. Sheets made from synthetic fiber spun fabrics, such as nonwoven textiles, may be used as a textile substrate. Cloth that is woven, knitted or the like is also suitable as a textile substrate. A fabric may comprise flame retardant(s), filler(s), or additive(s) disclosed above.

For example, a fabric may comprise a 50% nylon-50% cotton blend woven fabric (also known as NYCO) such as those by Bradford Dyeing Association, Inc., in Bradford, R.I. A fabric of note is a polyester woven fabric from Millikin and Company (Spartanburg, S.C.).

A textile may also include nonwoven textiles prepared from polypropylene, polyethene, polyesters such as polyethylene terephthalate or mixtures thereof, and other spun bonded polymer fabrics.

While the substrate has been described generally as a textile, the substrate can be any other material that is capable of accommodating thereon one or a plurality of layers or accommodating therein a dispersion of the selectively permeable composition.

Cellulosic materials such as paper webs (for example Kraft or rice paper), materials made from synthetic fiber spun fabrics, microporous films, or even perforated films having large percentages of open areas such as perforated PE films, may be used as materials for the substrate(s), for example. These materials may be reinforced with fibers. Microporous films of note may be prepared from polypropylene, polyethylene or combinations thereof. They may be monolayer or multilayer films (for example, three-layer films comprising an inner layer of polypropylene between two outer layers of polyethylene). Microporous films are available from Celgard, LLC, Charlotte, N.C. under the CELGARD tradename.

Suitable polymers for the a microporous film are (1) linear ultrahigh molecular weight polyethylene having an intrinsic viscosity of at least 18, preferably 18 to 39, deciliters/gram, (2) linear ultrahigh molecular weight polypropylene having an intrinsic viscosity of at least 6 deciliters/gram, and (3) mixtures of (1) and (2).

The microporous film may include a finely divided, particulate, substantially water-insoluble, inorganic filler, for example a siliceous filler, which is distributed throughout the matrix and which is present in amount 50 to 90%, particularly 50 to 85%, by weight of the film. The filler may be silica, precipitated silica, or silica having an average ultimate particle size of less than 0.1 µm and may occupy 35 to 80% of the total volume of microporous film. Because they have a relatively narrow range of pore sizes, films may be made by extruding a polymeric composition which contains an inorganic filler and a processing oil, e.g. a paraffinic oil, naphthenic oil or aromatic oil, uniformly distributed therein; followed by extraction of the processing oil, e.g. with trichloroethylene. Some films are disclosed, for example, in U.S. Pat. Nos. 4,937,115 and 3,351,495 and films are sold by PPG Industries under the tradename TESLIN.

Specific examples of porous or perforated films include a porous PE film having a porosity of about 55% and a pore size of about 0.25 microns, available under the tradename CELGARD K878 from Hoechst Celanese Corp; a porous PE film available under the tradename MSX 1137P from 3M Co.; and a filled porous PE film available under the designation Van Leer 10X from Van Leer Corp. TESLIN SP7 is a filled porous PE films containing about 60% silica, having a thickness of about 0.18 mm (0.007 inch), a tear strength measured as described above of about 90 g, a porosity of about 65%, an average pore size of about 0.1 micron and a largest pore size of 4 to 10 microns. TESLIN X457 is similar to TESLIN SP7 but is more porous. TESLIN SP10 is similar to TESLIN SP7 but has a thickness of about 0.25 mm (0.010 inch). All three TESLIN films are available from PPG Industries. A perforated high density polyethylene film, 0.11 mm (4.5 mil) thick, with an open area of about 36%, is available under the tradename DELNET from Applied Extrusion Technologies.

A substrate can be a porous sheet material comprising a fluoropolymer. A substrate can be sheet material made with expanded polytetrafluoroethylene that is available from many companies, including W. L. Gore & Associates of Wilmington, Del. Other porous substrates include porous or microporous polyurethane films, filter materials from companies such as Millipore, nano- or micro-fiber structures, natural or synthetic fibers, other related supports that add dimensional stability, or combinations of two or more thereof.

The method provides structures comprising the selectively permeable composition and a substrate. The protective structures can be in the form of, for example, tarpaulins, covers, and the like. The membrane from the composition can be present as a layer of material added to the protective structure, or as one component of a fabric incorporated into the protective structure. Coated fabrics, used previously as tarpaulins or other covers, may have at least one wear resistant outer layer that generally needs high flexibility, high resistance to marring from wear, abrasion, scuffing, and scratching, high mechanical strength and toughness. Coating compositions preferably exhibit good adhesion to fabrics and other substrates such as plastic films and cellulosic materials such as paper or paperboard. They also desirably exhibit good melt processability, good colorability, good printability, and high transparency and/or gloss. Previous coating compositions for these applications include plasticized or flexible polyvinyl chloride. The composition described herein provides a superior coating composition to previous coating materials because it is selectively permeable.

Other uses for the selectively permeable protective structure include protective garments.

The protective structure may further comprise other layers such as adhesive layers, thermal insulation layers, cushioning layers, absorptive layers, reactive layers, and the like.

Insulation layers and cushioning layers may comprise an organic thermoplastic fiber-based material comprising, e.g., polyester, polyethylene or polypropylene. For example, the thermal insulating or cushioning layer is a fiberfill batt comprising polyester. A fiberfill batt sold as THERMOLITE ACTIVE ORIGINAL by DuPont is suitable. Alternatively, the thermal insulating layer may comprise melt-blown fibers, such as melt-blown polyolefins, sold as THINSULATE, by 3M. They may also include other materials such as fiberglass batts.

The mechanical properties and ease of processing of the selectively permeable composition, and its ability to transport water vapor and block liquids, optionally combined with a support substrate render protective structures thereof applicable for covering or enclosing articles during transport and storage.

A variety of structural configurations may be used to produce the protective structure. For example, the variably permeable multilayer structure may be in the form of a flexible sheet of material. The sheet material may be wrapped around an article to be protected from corrosion in the same way conventional plastic films are used. Some structural configurations are as follows.

(1) sheets of material comprising the selectively permeable structure that may be wrapped around or draped over the object(s) being packaged. For example, the object, which may be a piece of equipment or a pallet and its load, may be wrapped or covered with a substantially flat rectangular sheets having similar length and width that may be draped and optionally mechanically fastened in place (for example, with straps, ropes, elastic bands or the like) over the object, such as tarpaulins and the like.

These forms may be preferred when a large variety of objects of different size and shape are to be packaged at a given time or location.

(2) Bags, pouches, hoods or sheathes comprised completely of the selectively permeable structure described herein or which comprise other materials such as other polymeric materials, woven or nonwoven textiles and the like and have windows, patches or areas thereon which comprise the selectively permeable structure.

These forms are prepared from sheets or films that are formed into a concave shape that can accommodate the object to be protected. These forms may be preferred when a large number of objects of similar size and shape are to be packaged at a given time or location.

(3) Rigid or semi-rigid or flexible structures such as tubs, boxes, bins and the like, comprised completely of the selectively permeable structure or comprised in part of other materials incorporating one or more windows of the variably permeable multilayer structure.

(4) Lidding material comprised completely of the selectively permeable structure or comprised in part of other materials incorporating one or more windows of the selectively permeable structure. The lidding material may be used in combination with rigid or semi-rigid or flexible structures such as tubs, boxes, bins and the like to prepare a package comprising the selectively permeable structure.

(5) Patches of the selectively permeable structure over designed openings of packages to provide the desired permeability.

(6) Structures in which the selectively permeable structure is covered by a removable protective cover that allows a user to expose the selectively permeable structure to the environment at an appropriate time. For example, the protective cover may comprise a material with low adhesion to the selectively permeable structure that may be peeled away from the surface of the selectively permeable structure when desired. Alternatively, the cover may be removable material that overlays the selectively permeable structure, but is not adhered to it. For example, the protective cover may be a lid, flap or patch of protective (such as barrier) material that may be removed when desired. The protective cover may also be placed over a patch or window of the selectively permeable structure in a package.

This form of protective cover may provide extra protection of equipment during rain or other inclement weather, after which the barrier flap is removed to allow for moisture to vent through the selectively permeable membrane.

Numerous variations of these structures are also possible and such structures will become apparent to those skilled in the art upon reading this disclosure.

The following Examples are presented to demonstrate and illustrate, but are not meant to unduly limit the scope of, the invention.

EXAMPLES

MI, the mass rate of flow of a polymer through a specified capillary under controlled conditions of temperature and pressure, was determined according to ASTM 1238 at 190° C. using a 2160 g weight, reported in g/10 minutes.

For samples with high water permeability (>100 $g/m^2$-24 h), the water vapor transmission tests were conducted on a Mocon PERMATRAN-W 101K, following ASTM D6701-01, at 37.8° C. at 100% relative humidity. Moisture vapor permeation values (MVPV) on film samples are reported in g-mil/m²-24 h while MVTR are reported in g/m²-24 h.

Materials Used

EAC-1: a dipolymer of ethylene and methacrylic acid (19 weight %), with MI of 300 g/10 min.

ABA: A mixture containing 90 weight % of a mixture of arachidic acid and behenic acid with 6 weight % $C_{18}$ acids and 4 weight % other acids commercially available under the tradename Hystrene® 9022 from Chemtura.

EMA-1: an ethylene/methyl acrylate copolymer with 24 weight % copolymerized methyl acrylate units (remainder ethylene), with MI of 2 g/min.

G-1: an ethylene/methyl acrylate copolymer with 24 weight % copolymerized methyl acrylate units prior to grafting, grafted with 1.8 weight % of maleic anhydride.

Employing a Werner & Pfleiderer single-screw extruder, a composition containing 80 weight % of EAC-1 and 20 weight % of ABA was nominally neutralized to 93-97% with potassium hydroxide (Composition A). Composition A has MI of 0.6 g/10 min. Composition A was extruded through a film die to prepare a cast film with 2-mil thickness and the film properties summarized in Table 1.

Similarly, a composition containing 90 weight % of EAC-1 and 10 weight % of sodium stearate based on the combined weight of EAC-1 and sodium stearate was nominally neutralized to 73% with sodium hydroxide (Composition B). Composition B has MI of 2.4 g/10 min.

TABLE 1

Properties of Composition A

|  | MD | TD | Average |
|---|---|---|---|
| 2% Tensile Modulus |  |  |  |
| (psi) | 25400 | 18300 | 21850 |
| Elmendorf Tear-notched (ASTM1922) |  |  | Unnotched |
| (g/mil) | 9.07 | 20.6 | 14.84 |
| (g/mm) | 348 | 790 | 569 |
| Tensile properties (2 inch/min) |  |  |  |
| Tensile strength (psi) | 1600 | 1100 | 1350 |
| Elongation at break (%) | 290 | 149 | 219.5 |
| WVTR (mil-g/m²-day) | 12721 |  |  |

Composition A and Composition B were melt compounded with EMA-1 and G-1 by preparing salt-and-pepper pellet blends with the amounts shown in Table 2 and passing the pellet blends through two single screw extruders in an Egan extrusion coating machine equipped with a feed block to combine the melt from the two extruders. The extrusion conditions are summarized below.

TABLE 2

Weight % in blend

| Example | Composition A | Composition B | EMA-1 | G-1 |
|---|---|---|---|---|
| C1 | 35 | 0 | 65 | 0 |
| 1 | 35 | 0 | 55 | 10 |
| C2 | 40 | 0 | 60 | 0 |
| 2 | 40 | 0 | 50 | 10 |
| 2A | 40 | 0 | 50 | 10 |
| C3 | 45 | 0 | 55 | 0 |
| 3 | 45 | 0 | 45 | 10 |
| C4 | 0 | 40 | 60 | 0 |
| 4 | 0 | 40 | 50 | 10 |
| C5 | 0 | 50 | 50 | 0 |
| 5 | 0 | 50 | 40 | 10 |

The compositions listed in Table 2 were extrusion coated onto white unprinted woven polyester fabric commercially available from Milliken and Company (Spartanburg, S.C.) that had been corona treated at 5 kW. Coating was done at 75 feet/min line speed. 75° F. chill roll and nip roll pressure of 100 psi.

TABLE 3

| Example | Target Coating Thickness (Mils) | Melt Temperature (° F.) | Peel Strength (g/in) | Delay (hrs) | WVTR (g/m²-day) |
|---|---|---|---|---|---|
| C1 | 3 | 531 | 702 | 24 | 155 |
| 1 | 4 | 476 | 1322 | 24 | 116 |
| C2 | 3 | 472 | 930 | 24 |  |
| 2 | 3 | 473 | 1167 | 24 | 234 |
| 2A | 3 | 485 | 893 | 24 | 268 |
| C3 | 3 | 472 | 439 | 24 | 239 |
| 3 | 3 | 486 | 769 | 24 | 353 |
| C4 | 3 | 484 | 570 | 72 | 111 |
| 4 | 3 | 485 | 803 | 24 | 133 |
| C5 | 3 | 481 | 419 | 72 | 157 |
| 5 | 3 | 486 | 302 | 24 | 190 |

The adhesion of the coating to the fabric was tested according to ASTM F904-84 and summarized in Table 3. In Table 3, "Delay" indicates the time after extrusion coating before the peel test was conducted. Examples 1-4, compositions containing the maleic anhydride graft copolymer G-1, all provided better adhesion to the fabric than the corresponding compositions C1-C4, not containing G-1. The MIs of EMA-1 and G-1 are higher than the MI of Composition A, so they may be concentrated near the surface of the extrudate, thereby improving adhesion to the substrate. Extrusion melt temperature may influence the adhesion of the coating as demonstrated by Examples 2 and 2A. Lower extrusion temperatures may be desirable to provide enhanced adhesion. Composition B has MI more nearly matching EMA-1 and G-1. A blend of Composition B, EMA-1 and G-1 does not show enhanced adhesion under the extrusion conditions tested.

The WVTR was measured according to ASTM method D-6701-01 and summarized in Table 3. Permeability may be enhanced when the maleic anhydride graft copolymer is included in the blend.

The invention claimed is:

1. A method for preparing a selectively permeable multilayer structure or article comprising:
   (1) preparing a first composition comprising
      (i) one or more ethylene acid copolymers; and
      (ii) one or more organic acids; wherein at least 50% of the combined acidic groups in the acid copolymer and the organic acid are nominally neutralized to salts with metal ions and at least 50% of the metal ions are alkali metal ions;
   (2) melt blending the first composition with one or more ethylene-containing polymers selected from the group consisting of polyethylene (PE) homopolymers, copolymers of ethylene and an α-olefin, copolymers of ethylene and a diolefin, and ethylene copolymers obtained from copolymerization of ethylene with at least one polar monomer selected from the group consisting of vinyl acetate, acrylic ester, methacrylic ester and carbon monoxide, wherein ethylene-containing polymer does not comprise a dicarboxylic acid derivative, to provide a second composition;
   (3) melt blending the second composition with a polymer comprising 0.1 to 15 weight % of a dicarboxylic acid derivative selected from the group consisting of maleic anhydride, citraconic anhydride, itaconic anhydride, tetrahydrophthalic anhydride, monoalkyl esters of maleic acid, fumeric acid, citraconic acid, itaconic acid or tetrahydrophthalic acid, and combinations thereof, to provide a third composition in a molten condition;

(4) contacting a substrate with the molten third composition to adhere, embed, or impregnate the melted composition to the substrate or adhere, embed, or impregnate the substrate to the molten third composition to provide a coated substrate with the third composition in a molten condition;

(5) cooling the coated substrate to allow the molten third composition to cool and solidify.

2. The method of claim 1 wherein the substrate comprises textile or porous sheet material.

3. The method of claim 2 wherein the substrate is one or more porous films, flash spun non-woven fabrics, woven fabrics of synthetic fibers, natural fibers or combinations thereof, scrims, or filter materials.

4. The method of claim 3 wherein the substrate is a woven fabric of synthetic fibers, natural fibers or combinations thereof.

5. The method of claim 1 wherein at least 50% of the metal ions are sodium ions.

6. The method of claim 1 wherein at least 50% of the metal ions are potassium ions.

7. The method of claim 1 wherein the ethylene-containing polymer is selected from the group consisting of ethylene copolymers obtained from copolymerization of ethylene with at least one polar monomer selected from the group consisting of vinyl acetate, acrylic ester, methacrylic ester and carbon monoxide.

8. The method of claim 7 wherein the ethylene-containing polymer is an ethylene/alkyl acrylate or ethylene/alkyl methacrylate copolymer.

9. The method of claim 1 wherein both the ethylene-containing polymer and the dicarboxylic acid derivative-containing copolymer are blended simultaneously with the first composition.

10. The method of claim 1 wherein the third composition comprises (a) 30 to 50 weight %, based on the combination of (a), (b) and (c), of a blended combination of (1) 70 to 96 weight %, based on the combination of (1) and (2), of one or more E/X/Y ethylene acid copolymers or ionomers of the acid copolymers wherein E represents copolymerized units of ethylene, X is present in about 2 to about 35 weight % of the copolymer and represents copolymerized units of at least one $C_3$ to $C_8$ α,β-ethylenically unsaturated carboxylic acid, and Y is present in 0 to about 35 weight % of the copolymer and represents copolymerized units of alkyl acrylate or alkyl methacrylate;

(2) 4 to 30 weight %, based on the combination of (1) and (2), of one or more organic acids having from 4 to 36 carbon atoms, or salts thereof; wherein at least 50% of the combined acidic groups in the E/X/Y copolymer and the organic acid are nominally neutralized to salts with metal ions; wherein at least 50% of the metal ions are alkali metal ions;

(b) 40 to 60 weight %, based on the combination of (a), (b) and (c), one or more ethylene-containing polymers selected from the group consisting of polyethylene homopolymers, copolymers of ethylene and an α-olefin, copolymers of ethylene and a diolefin, and ethylene copolymers obtained from copolymerization of ethylene with at least one polar monomer selected from the group consisting of vinyl acetate, acrylic ester, methacrylic ester and carbon monoxide, wherein the ethylene-containing polymer does not comprise a dicarboxylic acid derivative; and (c) 1 to 15 weight %, based on the combination of (a), (b) and (c), of the polymer comprising 0.1 to 15 weight % of a dicarboxylic acid derivative; wherein (a), (b) and (c) total 100 weight %.

11. The method of claim 10 wherein the ethylene-containing polymer is selected from the group consisting of ethylene copolymers obtained from copolymerization of ethylene with at least one polar monomer selected from the group consisting of vinyl acetate, acrylic ester, methacrylic ester and carbon monoxide.

12. The method of claim 11 wherein the ethylene-containing polymer is an ethylene/alkyl acrylate or ethylene/alkyl methacrylate copolymer.

13. The method of claim 11 wherein both the ethylene-containing polymer and the dicarboxylic acid derivative-containing copolymer are blended simultaneously with the first composition.

14. The method of claim 10 wherein the third composition comprising (a), (b) and (c) has greater adhesion to the substrate than a corresponding composition comprising an equal amount of (a) and an amount of (b) equal to the amount of (b) and (c) in the third composition.

15. The method of claim 1 wherein the third composition has a moisture vapor permeation value of at least 200 g-mil/m²/24 h measured at 37.8° C. and 100% relative humidity according to ASTM D-6701-01 and high water-entry pressure.

16. The method of claim 1 wherein the selectively permeable structure has a moisture vapor transmission rate of at least 30 g/m²/24 h measured at 37.8° C. and 100% relative humidity according to ASTM D-6701-01.

* * * * *